(12) United States Patent
Yin et al.

(10) Patent No.: US 11,647,356 B2
(45) Date of Patent: May 9, 2023

(54) PROXIMITY POSITIONING

(71) Applicant: International Business Machines Corporation, Armonk, NY (US)

(72) Inventors: Yong Yin, Beijing (CN); Jia Tian Zhong, Beijing (CN); Dong Hui Liu, Beijing (CN); Peng Hui Jiang, Beijing (CN); Xing Xing Shen, Beijing (CN); Li Cao, Beijing (CN); Jia Yu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 17/068,862

(22) Filed: Oct. 13, 2020

(65) Prior Publication Data

US 2022/0116739 A1    Apr. 14, 2022

(51) Int. Cl.
*H04W 4/02* (2018.01)
*G01S 5/02* (2010.01)
*H04W 4/80* (2018.01)

(52) U.S. Cl.
CPC ........... *H04W 4/023* (2013.01); *G01S 5/0221* (2013.01); *G01S 5/02585* (2020.05); *H04W 4/80* (2018.02)

(58) Field of Classification Search
CPC ..... H04W 4/023; H04W 4/80; G01S 5/02585; G01S 5/0221
See application file for complete search history.

(56) References Cited

U.S. PATENT DOCUMENTS

| 7,010,098 B2 | 3/2006 | Moquin | |
|---|---|---|---|
| 2006/0220879 A1 | 10/2006 | Chan | |
| 2014/0330905 A1* | 11/2014 | Kwak | H04W 40/10 709/204 |
| 2022/0078578 A1* | 3/2022 | Brumley | H04W 4/023 |

FOREIGN PATENT DOCUMENTS

JP    2018522239 A    8/2018

OTHER PUBLICATIONS

"Contact Tracing", Google, Bluetooth Specification, Preliminary—Subject to Modification and Extension, Apr. 2020, v1.1, 6 pages.
"Sonarax's Social Distance Keeper—Stay in the Safe Zone with Measured Distance, Duration & Data", SONARAX—Data Over Sound, retrieved from the Internet on Aug. 24, 2020, 4 pages, <https://www.sonarax.com/social-distancing-keeper>.

(Continued)

*Primary Examiner* — Muthuswamy G Manoharan
(74) *Attorney, Agent, or Firm* — Wiliam H. Hartwell; Jared L. Montanaro

(57) ABSTRACT

Software for proximity positioning that performs the following operations: (i) receiving at least one parameter via an advertising channel of a first protocol, wherein the at least one parameter is encoded in an advertising packet of the first protocol, and wherein the first protocol supports a first proximity positioning technology; (ii) extracting the encoded at least one parameter from the advertising packet; and (iii) performing, by a second proximity positioning technology different from the first proximity positioning technology, a measurement of distance based, at least in part, on the at least one parameter.

20 Claims, 7 Drawing Sheets

(56) References Cited

OTHER PUBLICATIONS

Cruze, Danny Cyril D, "Aarogya Setu App: How Bluetooth helps in identifying Covid-19 suspects", Updated: Apr. 24, 2020, livemint, 14 pages, <https://www.livemint.com/technology/tech-news/aarogya-setu-app-how-bluetooth-helps-in-dentifying-covid-19-suspects-11587730877077.html>.

Kamycki, Szymon, "Nearby Messages: Sharing Information With the Person That Is Near You", Freeport Metrics, Blog, Dec. 5, 2018, 11 pages, <https://freeportmetrics.com/blog/nearby-messages-sharing-information-with-the-person-that-is-near-you/>.

Mell et al., "The NIST Definition of Cloud Computing", Recommendations of the National Institute of Standards and Technology, Special Publication 800-145, Sep. 2011, 7 pages.

Montanari et al, "A Study of Bluetooth Low Energy Performance for Human Proximity Detection in the Workplace", 2017 IEEE International Conference on Pervasive Computing and Communications (PerCom), 10 pages, © 2017 IEEE.

* cited by examiner

PROXIMITY POSITIONING

BACKGROUND

The present application relates generally to computing technology, and more specifically, to methods, systems and computer program products for proximity positioning.

Various known methods for proximity positioning utilize Bluetooth to determine whether computing devices are within certain distances of each other. (Note: the term "Bluetooth" may be subject to trademark rights in various jurisdictions throughout the world and is used here only in reference to the products or services properly denominated by the mark to the extent that such trademark rights may exist.) Proximity positioning technologies can be utilized in indoor positioning systems (IPS), Smart Home systems, Internet of Things (IOT) systems, Internet of Vehicles (IOV) systems, contact tracing applications, and the like.

SUMMARY

The following presents a summary to provide a basic understanding of one or more embodiments of the disclosure. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products for proximity positioning are described.

According to an aspect of the present invention, there is a method, computer program product and/or system for proximity positioning that performs the following operations (not necessarily in the following order): (i) receiving at least one parameter via an advertising channel of a first protocol, wherein the at least one parameter is encoded in an advertising packet of the first protocol, and wherein the first protocol supports a first proximity positioning technology; (ii) extracting the encoded at least one parameter from the advertising packet; and (iii) performing, by a second proximity positioning technology different from the first proximity positioning technology, a measurement of distance based, at least in part, on the at least one parameter.

These and other features and advantages will be described in, or will become apparent to those of ordinary skill in the art in view of, the following detailed description of the example embodiments of the present invention.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
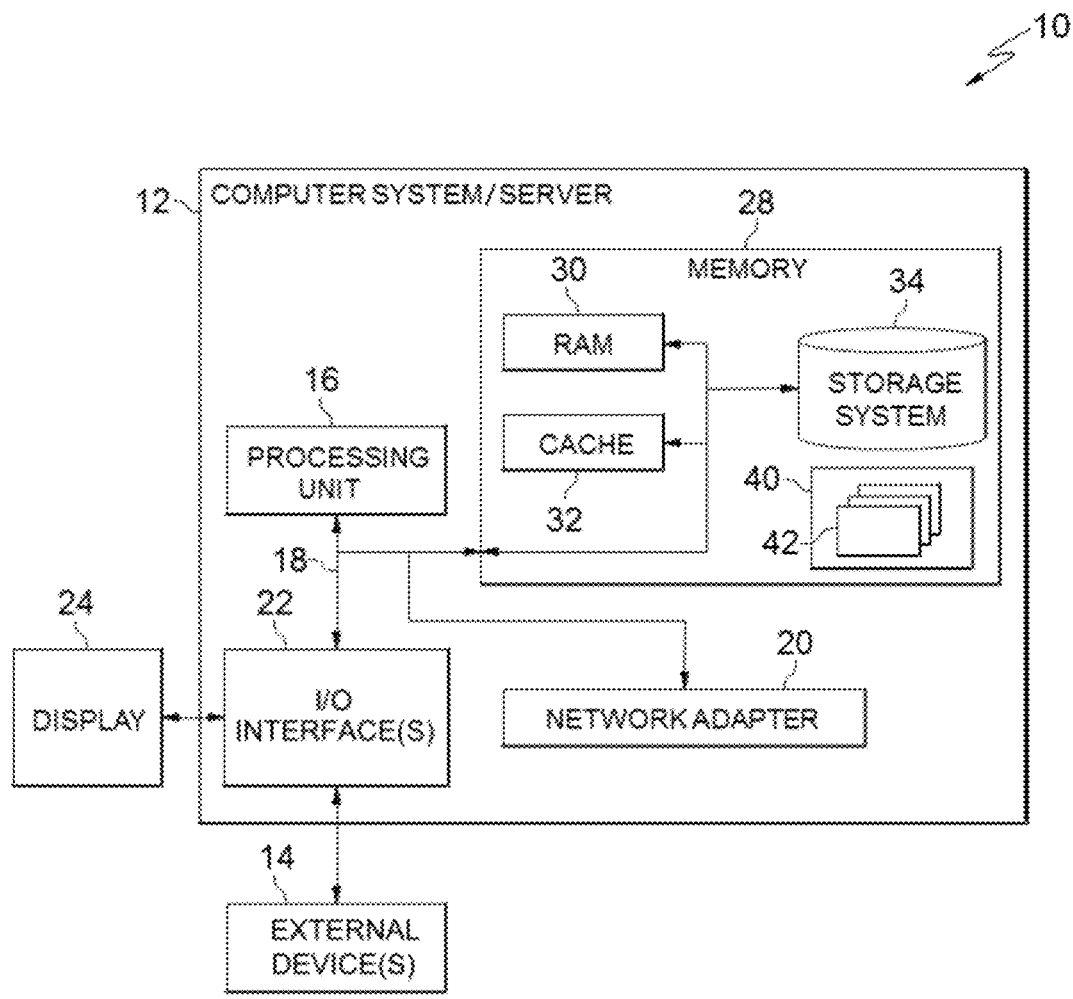
FIG. 1 depicts a cloud computing node according to an embodiment of the present invention.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown, according to an embodiment of the present invention. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general-purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
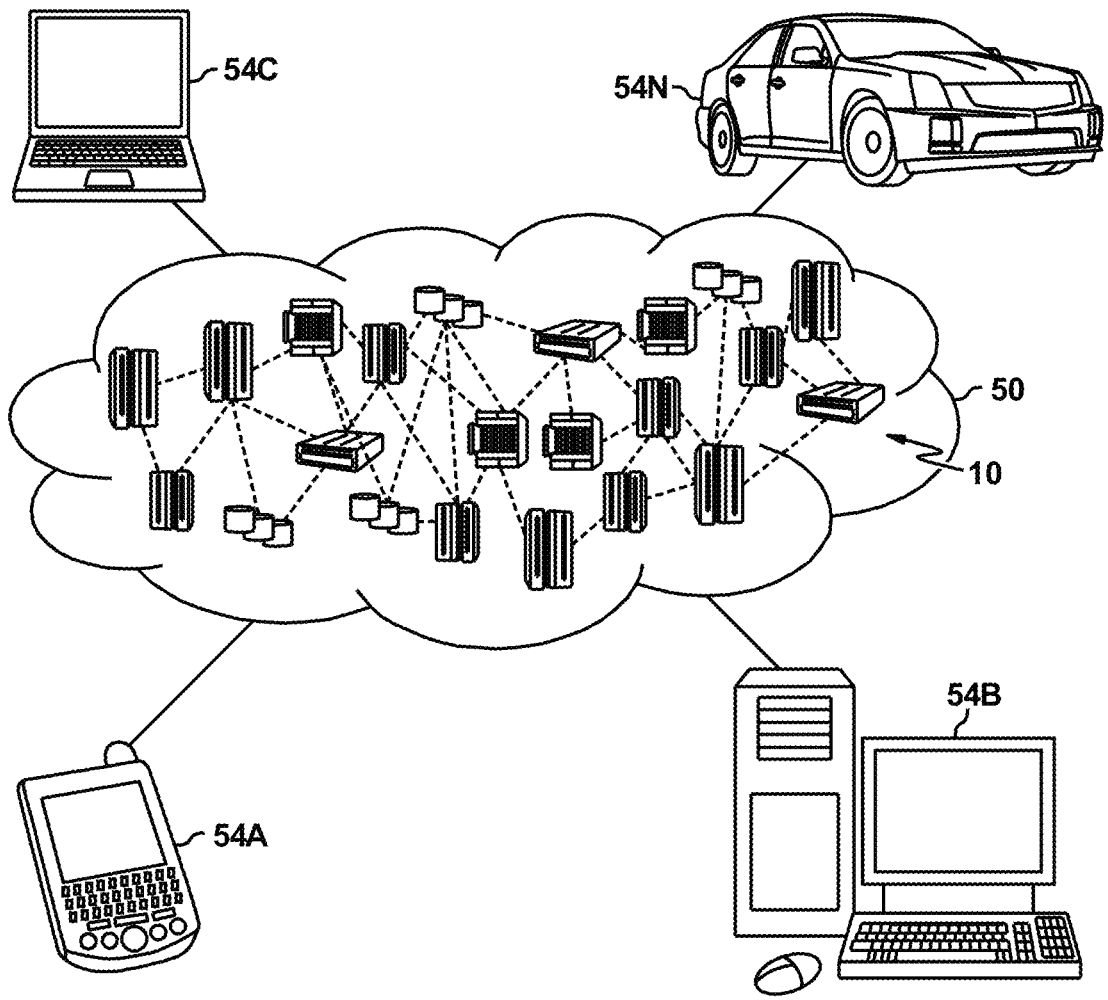
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
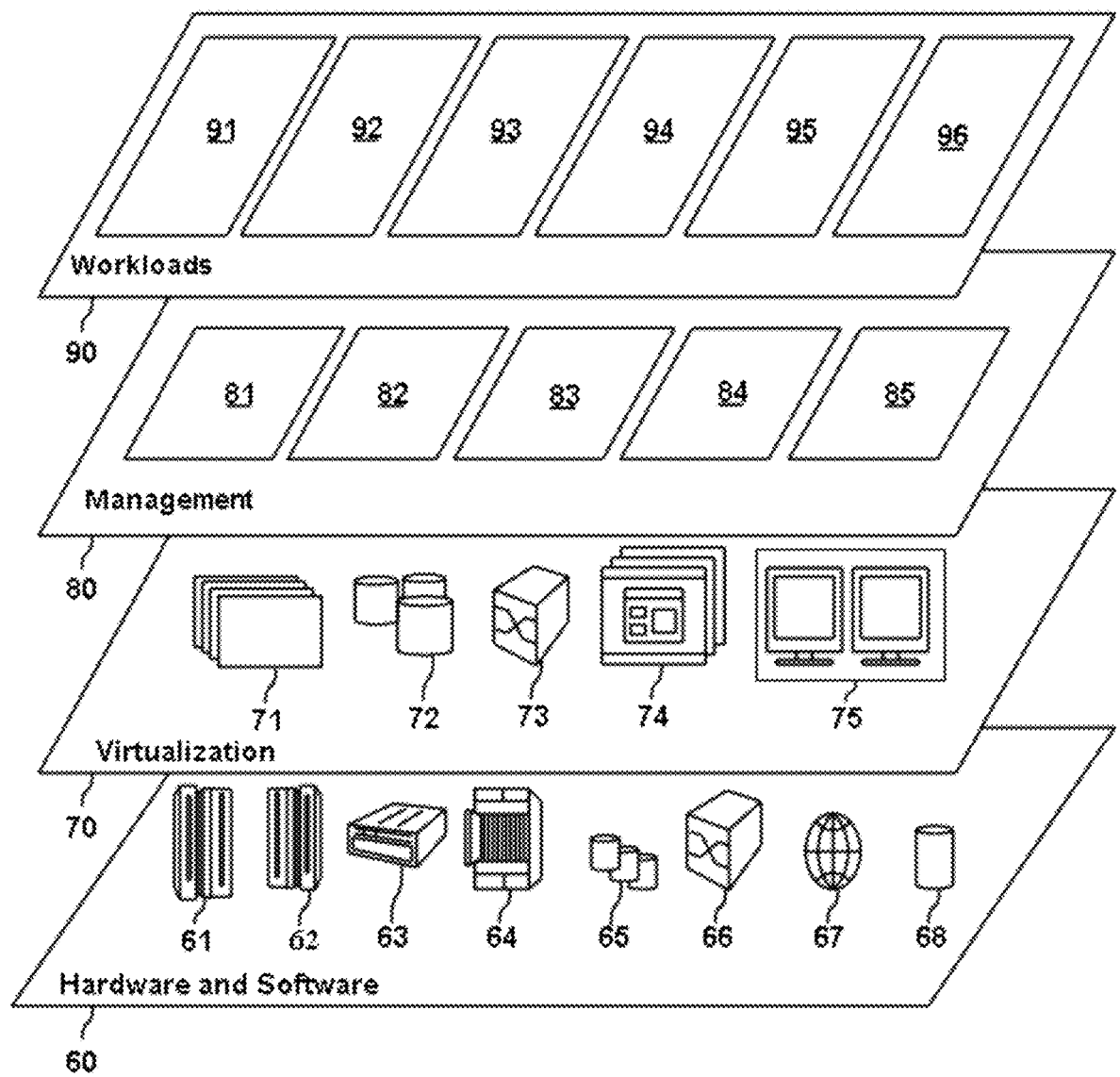
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 may include hardware and software components. Examples of hardware components may include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and proximity management 96 according to embodiments of the invention.

Various existing technologies utilize Bluetooth to determine whether computing devices are within certain distances of each other. However, Bluetooth location services may not be able to determine such distances within a desired amount of accuracy. For example, in a situation where a system needs to determine whether computing devices are within 6 feet (about two meters) of each other—such as in a social distancing calculation being performed for public health purposes—a Bluetooth-based system with an accuracy of 10 meters would not be sufficient. Embodiments of the present invention address such problems by providing a proximity positioning service with improved accuracy, as will be discussed below. While the below-discussed embodiments may generally describe social distancing scenarios, such scenarios are merely an application of the present invention, and therefore should not adversely limit the scope of the invention. Additional applications of this technology may include indoor positioning systems (IPS), Smart Home systems, Internet of Things (IOT) systems, Internet of Vehicles (IOV) systems, and the like.

In the following, embodiments of the present invention will be discussed with Bluetooth Low Energy (BLE) as an example of the a protocol and BLE-based positioning technology as an example of a first proximity positioning technology, however, it should be noted that the first proximity positioning technology may adopt any appropriate proximity positioning technology known or yet to be known in the art. Furthermore, it should be noted that the use of various technologies to perform proximity positioning in embodiments of the present invention includes various privacy protections with the appropriate permission/consent from the involved parties. For example, in certain embodiments, each party who wishes to participate in proximity positioning services must first affirmatively "opt-in" to the use of the underlying technologies for performing the proximity positioning services. In certain embodiments, such an "opt-in" would also be required periodically in order to continue the use of the proximity positioning services. However, it should be noted that these examples are not intended to be limiting, and that a wide variety of privacy protection schemes may be utilized, ensuring that privacy laws, regulations, and norms are met in the various jurisdictions in which the proximity positioning services are performed.

Figure 4:
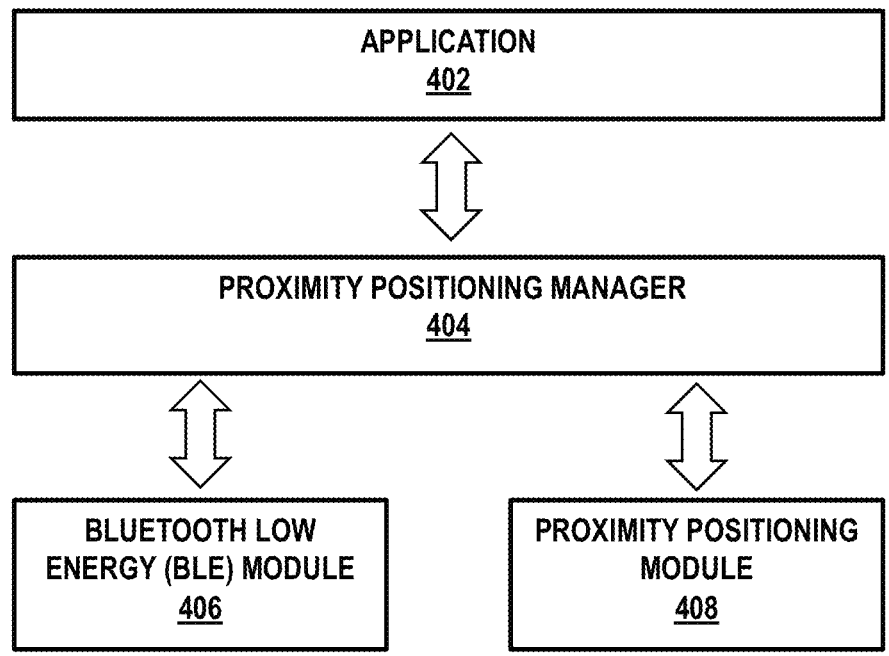
FIG. 4 depicts a block diagram of an exemplary system 400 according to an embodiment of the present invention.

Referring now to FIG. 4, in which a block diagram of an exemplary system 400 according an embodiment of the present invention is shown. According to an embodiment of the invention, system 400 comprises an application 402, a proximity positioning manager 404, a Bluetooth Low Energy (BLE) module 406 and a proximity positioning module 408. According to an embodiment of the invention, the system 400 may be in the form of a cellular phone, a tablet, and a smart wearable, etc. The application 402, according to an embodiment of the present invention, may be any application that may request proximity positioning service from the proximity positioning manager 404. The application 402 may be in a form of an app installed on a mobile device of a user that can be launched by the user to invoke the proximity positioning manager 404 to execute proximity positioning according to embodiments of the present invention. As a matter of fact, the application 402 may be any types of application that may request location service, however, according to an embodiment of the invention, the application may be a specific application packed together with the proximity positioning manager 404 and provide proximity positioning service according to embodiments of the invention, although it is shown in FIG. 4 that the application 402 and the proximity positioning manager 404 are separate components.

The proximity positioning manager 404 may be configured to provide proximity positioning service according to embodiments of the invention. Responsive to receiving a proximity positioning request, for example, via the application 402 from a user (or another service), the proximity positioning manager 404 may invoke corresponding components, for example, the BLE module 406 and the proximity positioning module 408, to execute proximity positioning according to embodiments of the present invention and provide corresponding results. The details of proximity positioning according to embodiments of the present invention will be discussed in more detail below with respect to FIG. 5 through 7. According to an embodiment of the present invention, the proximity positioning manager 404 may also provide results of proximity positioning to other services (directly or via the application 402) to provide accurate location to, for example, any other location-based services (LBS).

The BLE module 406 may be configured to be conformed with the Bluetooth Low Energy (BLE) standards by the Bluetooth Special Interest Group (Bluetooth SIG. The BLE module 406 may be invoked by the proximity positioning manager 404 and operated under the control of the proximity positioning manager 404 so that it can work together with the proximity positioning module 408 to provide proximity positioning service according to embodiments of the present invention. The proximity positioning module 408 may be configured to be conformed with standards of a proximity positioning technology different from BLE according to embodiments of the present invention, for example, ultrasound technology, to provide proximity positioning service with a better accuracy. According to an embodiment of the present invention, there may be a plurality of proximity positioning module 408 in the system 400 such that proximity positioning services with different accuracies may be provided. According to an embodiment of the invention, results of proximity positioning of the system 400 may also be provide to cloud-based LBS services, for example, proximity management 96 in FIG. 3.

In the following, proximity positioning according to embodiments of the present invention will be discussed in more detail. For the purpose of simplicity and better understanding, details will be described with system 400 of FIG. 4 and abovementioned social distancing scenario as an example, however, as pointed above, it should not adversely limit the scope of the invention.

Upon receiving a proximity positioning request by the system 400, for example, by the application 402 from a user or another service, the proximity positioning manager 404 may be invoked. The proximity positioning manager 404 may then invoke the BLE module 406, causing the BLE module 406 in an idle state to enter an advertising state in which advertising events of a connectable/connectionless broadcast to any scanning device or receiver in listening range may be broadcasted by the BLE module 406, wherein the connectionless broadcasting mechanism essentially allows data to be sent out in a one-way fashion to anyone, any device or anything that is capable of picking up the transmitted data. In the following, embodiments of the invention will be discussed with connectionless broadcasting mechanism as an example of implementation. However, it should be noted connectable broadcasting mechanism according to the BLE standards may also be adopted.

According to an embodiment of the present invention, the connectionless broadcast may send non-connectable advertising packets known as ADV_NONCONN_IND periodically via the BLE advertising channels to one or more other parties that may be able to receive them. The broadcasting of such advertising packets may be in accordance with the BLE standards. For example, in an advertising event including an advertising interval (advInterval) and an advertising delay (advDelay), i.e., T_advEvent=advInterval+advDelay, three advertising packets are broadcasted simultaneously on all three advertising channels (channel indices 37, 38 and 39, with respective central frequencies at 2402 MHz, 2426 MHz and 2480 MHz). According to the BLE standards in Bluetooth 4.0 up to Bluetooth 4.2, a standard advertising packet contains a 31-byte payload used to include data that describes the broadcaster (a party that sends the non-connectable advertising packets periodically to any party willing to receive them, also called as "advertiser") and its capabilities, but it can also include any custom information wishing to be broadcast to other parties. If this standard 31-byte payload is not large enough to fit the custom information wishing to be broadcasted, BLE also supports an optional secondary advertising payload (called the Scan Response), which allows an observer (a party that repeatedly scans the preset frequencies to receive any non-connectable advertising packets currently being broadcasted, also called as "scanner") that detects the broadcaster to request a second advertising packet with another 31-byte payload, for up to 62 bytes total. According to Bluetooth 5.0 standards, an advertising packet may hold up to 255 bytes of data, which is much larger than the 37-byte design in Bluetooth 4.0 up to Bluetooth 4.2. Bluetooth 5.0 also provides advertising extensions in which instead of sending advertising data on the 3 advertising channels, advertising packets are allowed to be chained together and the other 37 channels that did not carry advertising data before may be used. In the present disclosure, term 'advertiser', 'broadcaster' and 'a party broadcasting an advertising packet' may be interchangeable. Similarly, the term 'observer', 'scanner' and 'a party receiving an advertising packet' may also be interchangeable.

According to an embodiment of the present invention, the broadcasted non-connectable advertising packets (an example of such advertising packets according to embodiments of the present invention will be discussed below with reference to FIG. 7) are encapsulated, in corresponding payloads, with at least one parameter for measuring distance, with the at least one parameter being for a proximity positioning technology conformed with that employed by the proximity positioning module 408 and different from the proximity positioning technology based on BLE standards. Examples of such proximity positioning technologies may comprise, for example, ultrasound, infrared (IR), radio frequency (RF), ultrawideband (UWB), Wi-Fi, Zigbee, etc. Different proximity positioning technologies may provide proximity positioning services with different accuracies, for example, ultrasound positioning technology may provide an accuracy within few centimeters. Another example of such technology may be ultrawideband (UWB) positioning technology which may provide an accuracy of 10-30 centimeters. It should be noted that any appropriate technologies may be adopted without departing the spirit of the present disclosure. (Note: the term "Zigbee" may be subject to trademark rights in various jurisdictions throughout the world and is used here only in reference to the products or services properly denominated by the mark to the extent that such trademark rights may exist.)

Figure 7:
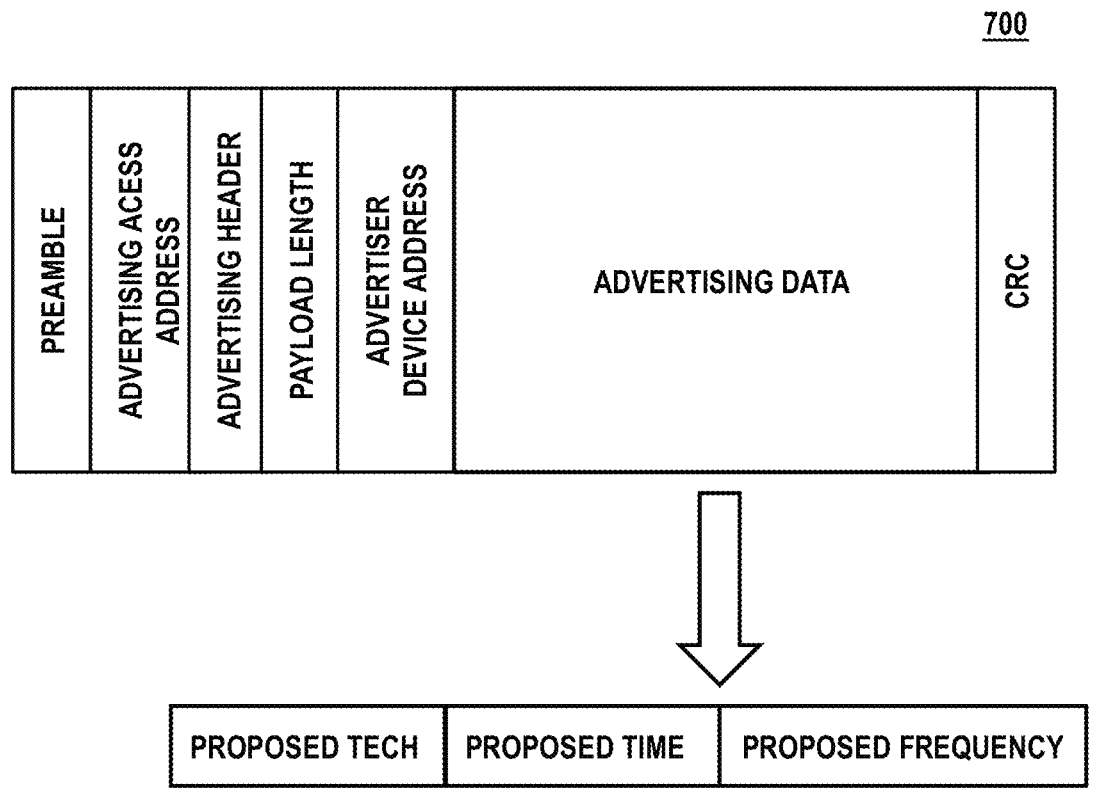
FIG. 7 depicts an exemplary BLE advertising packet according to an embodiment of the present invention.

Referring now to FIG. 7, diagram 700 depicts an exemplary BLE advertising packet according to an embodiment of the present invention. In FIG. 7, an exemplary advertising packet according to the present invention comprises a preamble field, an advertising access address field, an advertising header field, a payload length field, an advertiser device address field, an advertising data field and a cyclic redundancy check (CRC) field.

In the exemplary BLE advertising packet, the preamble field is used by a receiving party for synchronization (time, frequency) and to perform automatic gain control (AGC). The preamble field has a predefined pattern of size 1 byte which is known to the receiving party, with "10101010" in binary form used by an advertising packet. The advertising access address field uses a fixed pattern "0x8E89BED6" in hexadecimal form with a size of 4 octets, or 32 bits, to indicate an advertising packet. The advertising header field, the payload length field, the advertiser device address field, and the advertising data field together comprise an advertising channel protocol data unit (PDU). The size of the advertising header field is 8 bits, with the first four bits being "0010" in binary form representing ADV_NONCONN_IND, i.e., a non-connectable advertising packet. If, however, a connectable advertising packet ADV_IND is used, the first four bits of the advertising header are "0000" in binary form. The payload length field is 8 bits, indicating the payload field length in octets. The valid range of the payload length field is 1 to 31 in Bluetooth 4.0 up to Bluetooth 4.2, and is 1 to 255 octets in Bluetooth 5.0. The advertiser device address field is the media access control (MAC) address of the advertiser (broadcaster) from which an advertising packet is broadcasted, which is typically 6 bytes.

Following the advertiser device address field is the actual advertising data as is shown in FIG. 7. According to an embodiment of the invention, the advertising data comprises at least one parameter for measuring a distance, encoded in a binary form, and may be able to be extracted by the proximity positioning manager 404. According to an embodiment of the invention, the at least one parameter comprises parameters used by the proximity positioning module 408 for measuring distance. As discussed in the above, the proximity positioning module 408 utilizes a proximity positioning technology different from BLE.

According to an embodiment of the invention, the at least one parameter may comprise a parameter selected from the group consisting of: (i) a proposed type of proximity positioning technology (PROPOSED TECH) that indicates what type of proximity positioning technology the party broadcasting the advertising packet wishes to use to measure distance, for example, ultrasound positioning technology; (ii) a scheduled time of transmission (PROPOSED TIME) that indicates at what time the party broadcasting the advertising packet wishes to transmit a signal for measuring distance to a party receiving the advertising packet; and (iii) a proposed frequency of transmission (PROPOSED FREQUENCY) that indicates at what frequency the party broadcasting the advertising packet wishes to transmit a signal for measuring distance to a party receiving the advertising packet. In the event that both the broadcaster (advertiser) and the observers (scanners) only support a single type of proximity positioning technology that is pre-configured by the proximity positioning manager 404, for example, ultrasound positioning technology, the parameter "the proposed type proximity positioning technology" may be omitted from the at least one parameters in the advertising packet.

The proposed frequency of transmission functions as an identifier to uniquely identify a broadcaster and may be selected by a broadcaster from a pre-determined list of available frequencies. The pre-determined list of available frequencies is known to the proximity positioning manager 404 of each system 400. A broadcaster may select a frequency as the proposed frequency of transmission from the list of available frequencies and encode the information of the selected frequency in the payload of an advertising packet it broadcasts. Upon receiving the advertising packet from the broadcaster, observers may be aware that the selected frequency is unavailable. When an observer receiving the advertising packet needs to broadcast an advertising packet (i.e., the observer's role changes from an observer to a broadcaster), the observer may select an available frequency left in the list (such that the frequency selected by another broadcaster may not be re-used). In such a way of propagation, it is ensured that each system 400 may have a selected frequency (from the list of available frequencies) which alone can be used to uniquely identify the corresponding system 400. The system 400 with a highest possibility of having more close neighbors (e.g., above a threshold determined based on previous distance measurement) may be determined to be the first system 400 to broadcast. The system 400 which is the closest to the first system 400 may be determined as the second system 400 to broadcast, and so on.

According to an embodiment of the invention, a same frequency selected by a broadcaster from the pre-determined list of available frequencies may be selected by another broadcaster as long as the interval between the scheduled time of transmission is large enough to ensure isolation to avoid conflicts. In such a scenario, the address of a broadcaster and the select frequency together may function as an identifier to uniquely identify the broadcaster. It should be noted that, depending on the capabilities of different parties, the at least one parameter discussed here may comprise other types of information. Also, according to an embodiment of the invention, a plurality of sets of parameters corresponding to a plurality of proximity positioning technologies supported by a party broadcasting an advertising packet may be encapsulated in the payload of the advertising packet. A party receiving the advertising packet may select a set of supported parameters from the plurality of sets of parameters and notify the party broadcasting the advertising packet about the set of supported parameter such that the party broadcasting the advertising packet may construct a signal for measuring distance based on the selected set of parameter supported by the party receiving the advertising packet.

An advertising packet ends with a CRC with 24 bits in size for error detection, which is calculated over the PDU. It should be noted the exemplary advertising packet of FIG. 7 is described in accordance with the BLE standards in Bluetooth 4.0 up to Bluetooth 4.2, and exemplary advertising packet may be different in accordance with the BLE standards in Bluetooth 5.0 and up, however, it would be fairly easy for a person skilled in the art to design the structure of an advertising packet according to the BLE standards in corresponding versions of Bluetooth without departing the spirit of the present disclosure.

According to an embodiment of the present invention, the at least one parameter may be encoded according to a predefined scheme, for example, predefined by the proximity positioning manager 404. The at least one parameter, encoded in the payload of an advertising packet, may be received by a BLE module of an observer (scanner). The encoded at least one parameter may be retrieved from the payload of the received advertising packet by a proximity positioning manager 404 of the party receiving the advertising packet, and then decoded using the predefined scheme to obtain the at least one parameter. The party receiving the advertising packet may then expect based on the at least one parameter, a signal for measuring distance from the party broadcasting the advertising packet, in which the signal is constructed by the party broadcasting the advertising packet based on the at least one parameter (or based on the selected set of parameters supported by the party receiving the advertising packet).

According to an embodiment of the invention, a party broadcasting the advertising packet may construct a signal for the measurement of distance according to the at least one parameter the party broadcasted in the advertising packet (or according to the selected set of parameter supported by the party receiving the advertising packet), and then transmit the constructed signal according to the at least one parameter (or according to the selected set of parameters supported by the party receiving the advertising packet). The constructed signal may be transmitted in a 'broadcasting' mode according to the at least one parameter (or according to the selected set of parameters supported by the party receiving the advertising packet). For example, if the at least one parameter comprises (i) a proposed type of proximity positioning technology, (ii) a scheduled time of transmission, and (iii) a proposed frequency of transmission, the party broadcasting the at least one parameter may construct a signal for measuring distance using the proposed type of proximity positioning technology and transmit the constructed signal at the scheduled time of transmission and at a proposed frequency. In the event that both the broadcaster (advertiser) and the observers (scanners) only support a single type of proximity positioning technology that is pre-configured by the proximity positioning manager 404, for example, ultrasound positioning technology, the proximity positioning manager 404 of the party broadcasting the advertising packet may construct a signal in accordance with the pre-configured proximity positioning technology, i.e., ultrasound technology, and transmit the constructed signal at the scheduled time and at a proposed frequency. In the event that a broadcaster supports a plurality of proximity positioning technologies and broadcasts in an advertising packet a plurality of sets of parameters corresponding to the plurality of proximity positioning technologies, after getting notification from the party receiving the advertising packet about the set of supported parameters, the broadcaster may construct a signal for measuring distance using the type of proximity technology supported by the party receiving the advertising packet, and transmit the constructed signal at the scheduled time and at a proposed frequency.

Upon receiving, by an observer, a signal for measuring distance in accordance with the at least one parameter encoded in an advertising packet and broadcasted by a broadcaster, the observer may measure a distance with the broadcaster according to the signal based on the at least one parameter. For example, if the at least one parameter comprises (i) a proposed type of proximity positioning technology, (ii) a scheduled time of transmission, and (iii) a proposed frequency of transmission, the observer may receive the constructed signal at the scheduled time of transmission and at the proposed frequency from the broadcaster. As mentioned above, in the event that the proposed frequency of transmission alone functions as an identifier to uniquely identify the broadcaster, the observer (the party receiving the advertising packet) may measure a distance with the broadcaster according to the received signal based on the at least one parameter. If the proposed type of proximity positioning technology is ultrasound technology, the scheduled time of transmission is $t_1$ at frequency $f_1$, the speed of ultrasound at frequency $f_1$ is $v_{f1}$, and the time of receiving the signal is $t_2$, the proximity positioning manager 404 of the observer may measure the distance $D_{f1}$ between the broadcaster (uniquely identified by the proposed frequency $f_1$) and the observer using the following function and then record the distance in a local storage:

$$D_{f1}=v_{f1}*(t_2-t_1)$$

According to embodiments of the present invention, aside from the algorithm for measuring distance discussed above, other known or yet to be known distance measurement algorithms (e.g., algorithms based on Received Signal Strength Indication (RSSI), algorithms based on Angle-of-Arrival (AOA), algorithms based on Time of Arrival (TOA), algorithms based on Time Difference of Arrival (TDOA), algorithms based on Time of Flight (TOF), etc.) can also be used to measure the distance with the broadcaster.

According to an embodiment of the present invention, the measured distance is compared with a predetermined threshold and an alert may be issued if the measured distance is smaller than the predetermined threshold. According to an embodiment of the present invention, the proximity positioning manager 404 may work with other location-based services, e.g. cloud-based LBS, to provide positioning results with better accuracy.

Figure 5:
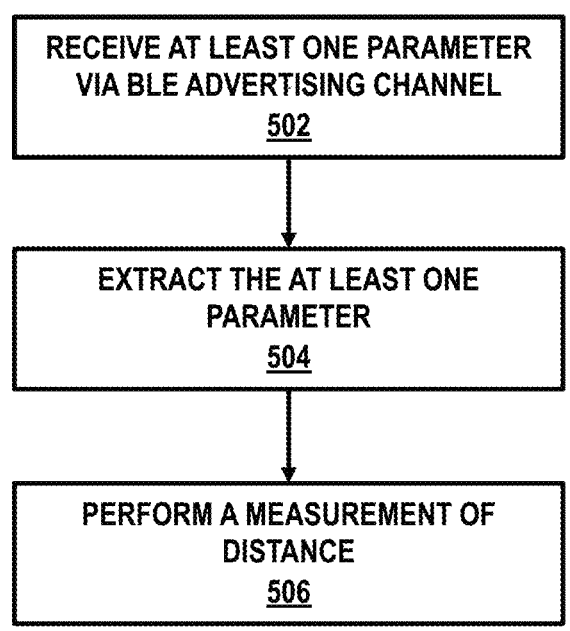
FIG. 5 depicts a flowchart of an exemplary method 500 according to an embodiment of the present invention.

Now referring to FIG. 5, an exemplary method 500 according to an embodiment of the present invention is depicted. At operation 502, at least one parameter is received via a Bluetooth Low Energy (BLE) advertising channel, for example by the BLE module 406 (see FIG. 4) of an observer from a broadcaster. The at least one parameter is encoded in a BLE advertising packet, for example, in the payload of the advertising packet described with reference to FIG. 7. The at least one parameter, according to an embodiment of the invention, is for measuring distance using a proximity positioning technology different from BLE, for example, the proximity positioning technology supported by the proximity positioning module 408 (see FIG. 4) of the broadcaster and the observer.

The method 500 then proceeds to operation 504, in which the encoded at least one parameter is extracted from the BLE advertising packet, for example by the proximity positioning manager 404 (see FIG. 4) of the observer. According to an embodiment of the present invention, the encoded at least one parameter is retrieved from the payload of the BLE advertising packet, and then decoded, for example by the proximity positioning manager 404 (see FIG. 4) of the observer, according to a predefined scheme.

Then, the method 500 proceeds to operation 506. At operation 506, a measurement of distance is performed based on the at least one parameter by the proximity positioning technology, for example, by the proximity positioning module 408 (see FIG. 4) of the observer. According to an embodiment of the invention, a signal for measuring distance, constructed according to the at least one parameter (or a selected set of parameter supported by the observer and notified to the broadcaster), for example, by the proximity positioning module 408 (see FIG. 4) of the broadcaster, is received by the observer. The observer then measures a distance with the broadcaster based on the signal. According to an embodiment of the present invention, the at least one parameter comprises at least one of: a proposed type of proximity positioning technology, a scheduled time of transmission, and a proposed frequency of transmission. According to an embodiment of the present invention, a signal for measuring distance is constructed by the broadcaster according to a proposed type of proximity positioning technology and then transmitted at a schedule time of transmission and at a proposed frequency from the broadcaster to the observer. The proposed frequency of transmission functions as an identifier to uniquely identify the broadcaster.

Figure 6:
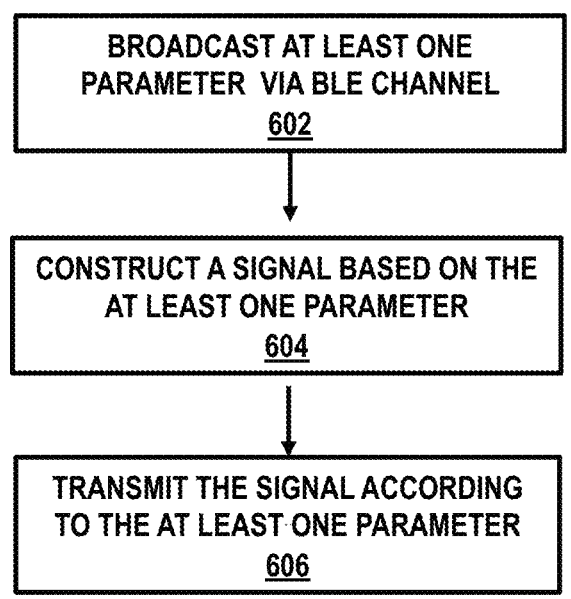
FIG. 6 depicts a flowchart of an exemplary method 600 according to an embodiment of the present invention.

Now referring to FIG. 6, an exemplary method 600 according to an embodiment of the present invention is depicted. At operation 602 of the method 600, at least one parameter for measuring distance is broadcasted via a Bluetooth Low Energy (BLE) advertising channel, for example by the BLE module 406 (see FIG. 4) of a broadcaster. The at least one parameter is encoded in a BLE advertising packet, for example, in the payload of the advertising packet described with reference to FIG. 7. The at least one parameter, according to an embodiment of the invention, is for measuring distance using a proximity positioning technology different from BLE, for example, the proximity positioning technology supported by the proximity positioning module 408 (see FIG. 4) of the broadcaster.

The method 600 then proceeds to operation 604, in which a signal for measuring distance is constructed according to the at least one parameter, for example, by the proximity positioning module 408 (see FIG. 4) of the broadcaster. Then, at operation 606, the signal for measuring distance is transmitted according to the at least one parameter, for example, by the proximity positioning module 408 (see FIG. 4) of the broadcaster. According to an embodiment of the present invention, the at least one parameter comprises at least one of: a proposed type of proximity positioning technology, a scheduled time of transmission, and a proposed frequency of transmission. According to an embodiment of the present invention, a signal for measuring distance is constructed according to a proposed type of proximity positioning technology and then transmitted at a schedule time of transmission and at a proposed frequency from the broadcaster to the observer.

An observer receiving the constructed signal for measuring distance may then measure a distance between the observer and the broadcaster based on the received signal and according to the at least one parameter, for example, by the proximity positioning module 408 (see FIG. 4) of the observer. For example, if the at least one parameter comprises (i) a proposed type of proximity positioning technology, (ii) a scheduled time of transmission, and (iii) a proposed frequency of transmission, the observer may receive, from the broadcaster, the constructed signal at the schedule time of transmission and at the proposed frequency. Then the observer may measure a distance with the broadcaster according to the received signal based on the at least one parameter. If the proposed type of proximity positioning technology is ultrasound technology, the scheduled time of transmission is $t_1$ at frequency $f_1$, the speed of ultrasound at frequency $f_1$ is $v_{f1}$, and the time of receiving the signal is $t_2$, the proximity positioning manager 404 of the observer may measure the distance $D_{f1}$ between the observer and the broadcaster (the party broadcasting the advertising packet) using the following function:

$$D_{f1}=v_{f1}*(t_2-t_1)$$

In the above, embodiments of the invention have been discussed with BLE as an example of the first protocol, BLE-based positioning technology as an example of the first proximity positioning technology, and ultrasound positioning technology as an example of the second proximity positioning technology. However, the first protocol may adopt any other communication protocols having advertising capabilities (broadcasting channel), for example, Wi-Fi. Also, the second proximity positioning technology may adopt any other proximity positioning technology having higher precision compared with the proximity positioning technology supported by the first protocol.

It should be noted that the proximity management according to embodiments of this disclosure can be implemented by computer system/server 12 of FIG. 1.

Embodiments of the present invention may be a system, a method, and/or a computer program product at any possible technical detail level of integration. The computer program product may include a computer readable storage medium (or media) having computer readable program instructions thereon for causing a processor to carry out aspects of embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for proximity positioning, the method comprising:
for a device of a set of devices:
  receiving, from each of one or more other devices of the set of devices, at least one parameter via an advertising channel of a first protocol supporting a first proximity positioning technology of the device, wherein the at least one parameter indicates unique transmission data utilized by the corresponding device with respect to a second proximity positioning technology of the device different from the first proximity positioning technology of the device;
  receiving one or more signals according to the at least one parameter and the corresponding unique transmission data;
  performing, by the second proximity positioning technology of the device, one or more measurements of distance from the device to the one or more other devices of the set of devices based, at least in part, on the received one or more signals;

identifying a number of proximate devices which fall within a threshold distance of the device of the set of devices based, at least in part, on the one or more measurements of distance from the device to the one or more other devices of the set of devices;

selecting a particular device of the set of devices for which the identified number of proximate devices is maximized relative to the set of devices; and enabling the selected particular device to broadcast a signal.

2. The computer-implemented method of claim 1, wherein the at least one parameter is encoded in a payload of the advertising packet.

3. The computer-implemented method of claim 2, wherein the extracting of the encoded at least one parameter comprises:

retrieving the encoded at least one parameter from the payload of the advertising packet; and decoding the encoded at least one parameter.

4. The computer-implemented method of claim 1, wherein the performing of the measurement of distance comprises:

receiving a signal from a party from which the at least one parameter was received, wherein the signal is constructed according to the at least one parameter; and measuring a distance from the party from which the at least one parameter was received based, at least in part, on the signal.

5. The computer-implemented method of claim 1, wherein the at least one parameter includes: a proposed type of the second proximity positioning technology of the device, a scheduled time of transmission, and a proposed frequency of transmission.

6. The computer-implemented method of claim 5, wherein the performing of the measurement of distance comprises:

receiving a signal from a party from which the at least one parameter was received according to the proposed type of the second proximity positioning technology of the device at the scheduled time and at the proposed frequency, wherein the signal is constructed with the proposed type of the second proximity positioning technology of the device and transmitted at the scheduled time and at the proposed frequency; and measuring a distance from the party from which the at least one parameter was received based, at least in part, on the signal.

7. The computer-implemented method of claim 1, further comprising:

broadcasting at least one further parameter encoded in a second advertising packet via the advertising channel of the first protocol, wherein the at least one further parameter is used to measure distance with a third proximity positioning technology of the device different from the first proximity positioning technology.

8. The computer-implemented method of claim 7, further comprising:

constructing a signal for measuring distance according to the at least one further parameter; and transmitting the constructed signal according to the at least one further parameter.

9. The computer-implemented method of claim 1, wherein the first protocol is Bluetooth Low Energy (BLE).

10. The computer-implemented method of claim 9, wherein the second proximity positioning technology of the device is selected from the group consisting of: ultrasound positioning technology, infrared (IR) positioning technology, radio frequency (RF) positioning technology, ultra-wideband (UWB) positioning technology, Wi-Fi positioning technology, and Zigbee positioning technology.

11. A computer program product for proximity positioning, the computer program product comprising a computer-readable storage medium having program instructions embodied therewith, the program instructions executable by one or more processing units to cause the one or more processing units to perform a method comprising:

for a device of a set of devices:

receiving, from each of one or more other devices of the set of devices, at least one parameter via an advertising channel of a first protocol supporting a first proximity positioning technology of the device, wherein the at least one parameter indicates unique transmission data utilized by the corresponding device with respect to a second proximity positioning technology different from the first proximity positioning technology of the device;

receiving one or more signals according to the at least one parameter and the corresponding unique transmission data;

performing, by the second proximity positioning technology of the device, one or more measurements of distance from the device to the one or more other devices of the set of devices based, at least in part, on the received one or more signals;

identifying a number of proximate devices which fall within a threshold distance of the device of the set of devices based, at least in part, on the one or more measurements of distance from the device to the one or more other devices of the set of devices;

selecting a particular device of the set of devices for which the identified number of proximate devices is maximized relative to the set of devices; and enabling the selected particular device to broadcast a signal.

12. The computer program product of claim 11, wherein the at least one parameter is encoded in a payload of the advertising packet.

13. The computer program product of claim 11, wherein the performing of the measurement of distance comprises:

receiving a signal from a party from which the at least one parameter was received, wherein the signal is constructed according to the at least one parameter; and measuring a distance from the party from which the at least one parameter was received based, at least in part, on the signal.

14. The computer program product of claim 11, wherein the at least one parameter includes: a proposed type of the second proximity positioning technology, a scheduled time of transmission, and a proposed frequency of transmission.

15. The computer program product of claim 11, wherein the first protocol is Bluetooth Low Energy (BLE), and wherein the second proximity positioning technology of the device is selected from the group consisting of: ultrasound positioning technology, infrared (IR) positioning technology, radio frequency (RF) positioning technology, ultra-wideband (UWB) positioning technology, Wi-Fi positioning technology, and Zigbee positioning technology.

16. A computer system for proximity positioning, the computer system comprising:

one or more processing units; and a computer readable storage medium having program instructions embodied therewith, wherein the program instructions are executable by the one or more processing units to cause the one or more processing units to perform a method comprising:

for a device of a set of devices:
- receiving, from each of one or more other devices of the set of devices, at least one parameter via an advertising channel of a first protocol supporting a first proximity positioning technology of the device, wherein the at least one parameter indicates unique transmission data utilized by the corresponding device with respect to a second proximity positioning technology of the device different from the first proximity positioning technology;
- receiving one or more signals according to the at least one parameter and the corresponding unique transmission data;
- performing, by the second proximity positioning technology of the device, one or more measurements of distance from the device to the one or more other devices of the set of devices based, at least in part, on the received one or more signals;
- identifying a number of proximate devices which fall within a threshold distance of the device of the set of devices based, at least in part, on the one or more measurements of distance from the device to the one or more other devices of the set of devices;
- selecting a particular device of the set of devices for which the identified number of proximate devices is maximized relative to the set of devices; and enabling the selected particular device to broadcast a signal.

17. The computer system of claim 16, wherein the at least one parameter is encoded in a payload of the advertising packet.

18. The computer system of claim 16, wherein the performing of the measurement of distance comprises:
- receiving a signal from a party from which the at least one parameter was received, wherein the signal is constructed according to the at least one parameter; and
- measuring a distance from the party from which the at least one parameter was received based, at least in part, on the signal.

19. The computer system of claim 16 wherein the at least one parameter includes: a proposed type of the second proximity positioning technology, a scheduled time of transmission, and a proposed frequency of transmission.

20. The computer system of claim 16, wherein the first protocol is Bluetooth Low Energy (BLE), and wherein the second proximity positioning technology of the device is selected from the group consisting of: ultrasound positioning technology, infrared (IR) positioning technology, radio frequency (RF) positioning technology, ultrawideband (UWB) positioning technology, Wi-Fi positioning technology, and Zigbee positioning technology.

* * * * *